(No Model.) 2 Sheets—Sheet 1.
G. T. McCORMICK.
STORING ICE.
No. 356,949. Patented Feb. 1, 1887.
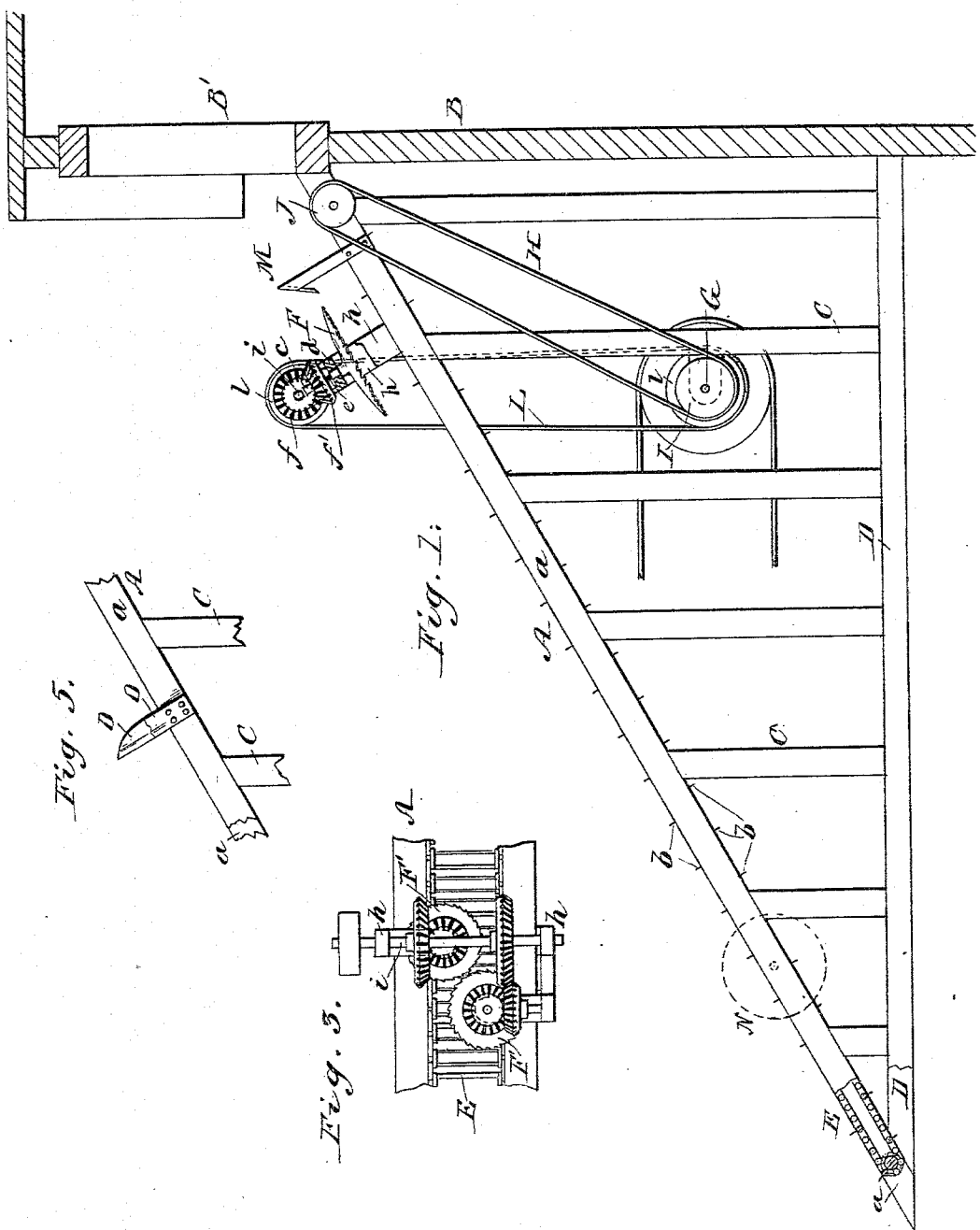
WITNESSES:
John V. Deemer
E. M. Clark
INVENTOR:
Geo. T. McCormick
BY Munn & Co.
ATTORNEYS.

(No Model.) 2 Sheets—Sheet 2.
G. T. McCORMICK.
STORING ICE.
No. 356,949. Patented Feb. 1, 1887.
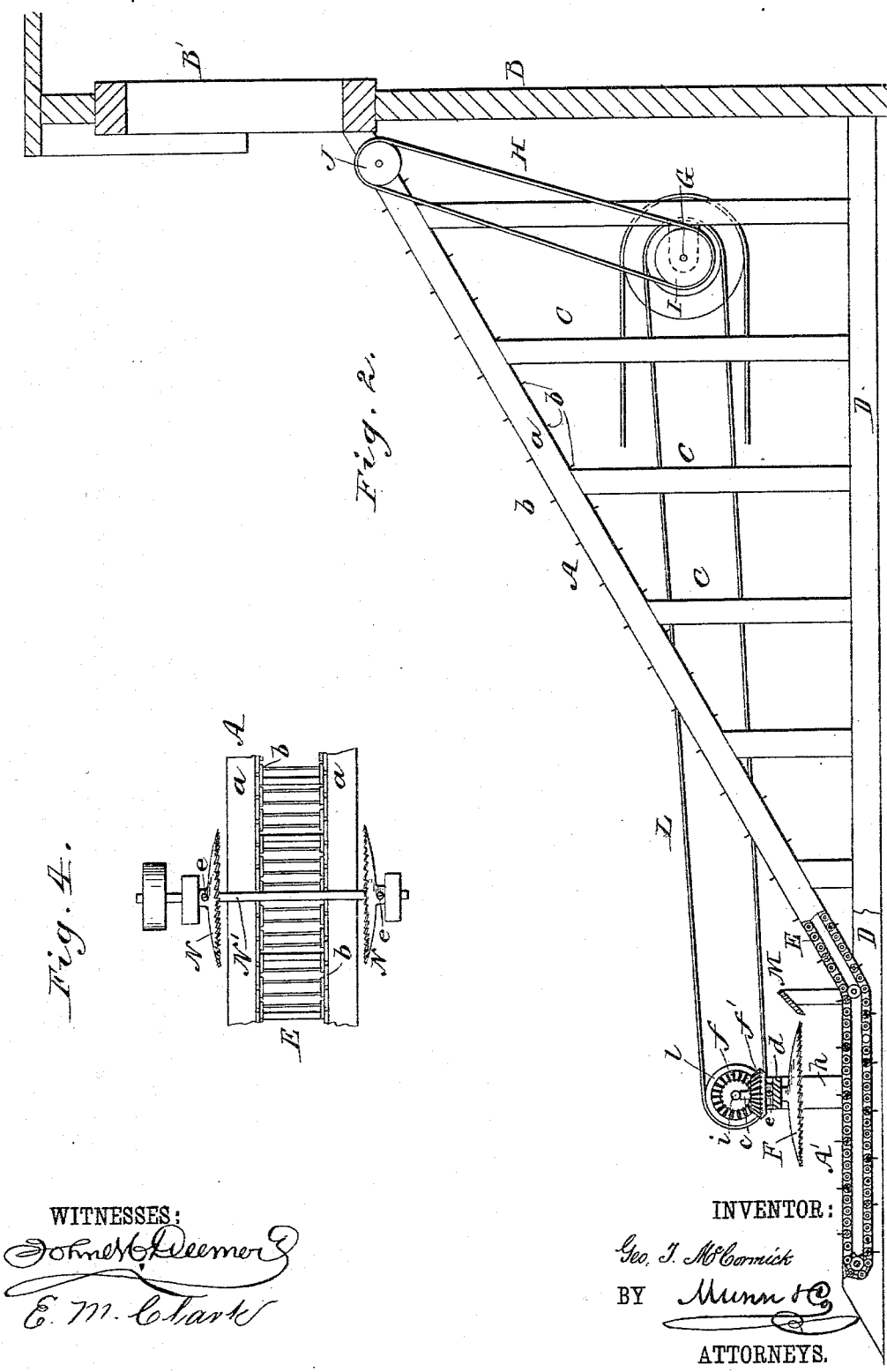
WITNESSES:
INVENTOR:
Geo. T. McCormick
BY Munn & Co.
ATTORNEYS.

UNITED STATES PATENT OFFICE.

GEORGE T. McCORMICK, OF NEW YORK, N. Y.

STORING ICE.

SPECIFICATION forming part of Letters Patent No. 356,949, dated February 1, 1887.

Application filed July 3, 1886. Serial No. 207,058. (No model.)

*To all whom it may concern:*

Be it known that I, GEORGE T. McCORMICK, of the city, county, and State of New York, have invented a new and useful Improvement in Storing Ice, of which the following is a full, clear, and exact description.

The object of my invention is to provide practical means for dressing or trimming blocks of ice at the same time and by the same power that moves the blocks along the tramway into the ice-house, so that only solid clear ice in blocks with uniform surfaces will enter the ice-house for packing, no matter what the surface condition of the ice in the field may be.

To this end my invention consists, principally, in the employment of a saw arranged above the tramway and parallel therewith, so that the honey-combed or snow ice and slush will be removed from each block by the saw as it is carried by the endless traveling chain under and past the saw.

The invention also consists of vertically-arranged saws or knives held at the sides of the tramway for dressing the side surfaces of the blocks or cakes of ice.

The invention also consists of the construction, arrangement, and combination of parts, all as hereinafter described and claimed.

Reference is to be had to the accompanying drawings, forming a part of this specification, in which similar letters of reference indicate corresponding parts in all the figures.

Figure 1 is a broken sectional side elevation of an ice-house and elevating-tramway having the surface-trimming saw applied thereto. Fig. 2 is a similar view of the same, showing a modified arrangement and construction of the saw and tramway. Fig. 3 is a detailed plan view showing another modification wherein two surface-trimming saws are used. Fig. 4 is a detailed plan view of a part of the tramway and endless elevating-chain, showing the side vertically-arranged saws for dressing the side edges of the blocks of ice; and Fig. 5 is a detailed side view showing knives in place of saws for trimming the side edges of the blocks of ice.

A represents an ordinary inclined ice-elevating tramway built adjoining the wall B of an ice-house and supported upon uprights C rising from suitable sills, D. Between the parallel side bars, $a\,a$, of the tramway is placed the endless traveling elevator or chain E, provided with points or projections $b\,b$, which engage with the blocks of ice placed on the tramway to be elevated, and cause them to slide up the tramway with the endless chain to the opening B' in the wall B of the icehouse.

In the form shown in Fig. 1 the tramway is built to form a continuous incline, while in Fig. 2 it is built to form an extended horizontal portion, A', so that the endless carrying-chain E has a horizontal action for a portion of its length, for the purpose hereinafter described.

Above the tramway, and parallel therewith, is arranged the circular saw F, so that the blocks of ice carried up by the chain E will be carried against and under the saw, so that it will trim off the upper surfaces of the blocks.

In the form shown in Fig. 1 the saw is arranged near the upper end of the tramway and inclined at the same angle as the tramway, and is revolved from the main drive-shaft G, which, through the medium of the belt H and pulleys I J, also imparts motion to the endless elevating-chain E. The saw F may be revolved by separate motive power, if desired; but I prefer to employ a single drive-shaft for the saw and traveling chain. The axle $c$ of the saw is journaled in a vertical bearing held by a cross-piece, $d$, supported by two uprights, $h$, framed into the side pieces, $a\,a$, of the tramway. In these uprights $h$, above the cross-piece $d$, is journaled the shaft $i$, which is revolved from the main drive-shaft G by belt L and pulleys $l\,l$, and which revolves the saw by the beveled gears $f\,f'$, secured, respectively, upon the shaft $i$ and axle $c$ of the saw. The axle $c$ passes through the gear-wheel $f'$, which is secured to the axle by the set-screw $e$, so that by loosening this set-screw the saw may be adjusted up or down to suit the thickness of the cakes of ice.

In the construction shown in Fig. 2 the saw F is arranged immediately over the horizontal portion A' of the tramway, so that when the blocks of ice are in contact with the saw they will exert but little resistance to the endless chain E, thus effecting some economy in power over the arrangement shown in Fig. 1.

The saws F are, by preference, convex, so that they will not only cut the porous and imperfect ice from the upper surface of the blocks, but will act to remove the trash from the blocks, and in some cases I shall use a scraper, M, arranged beyond the saw, to remove all trash that may remain upon the blocks after passing the saw; and if a flat saw is used the scraper will be quite necessary, so that the cakes, when delivered at the landing, will be entirely free of the soft and undesirable portions.

Where only a single saw F is used it will be of a width equal to or a little greater than the width of cakes of ice as they are cut for packing; but in some instances in place of a single wide saw I shall use two circular saws, F' F', as shown in Fig. 3, arranged one a little in front of the other and to lap slightly at the center of the tramway, so that each saw will dress one-half or thereabout of the width of each block. These saws may be operated from separate shafts, or from a single shaft, $i$, through the medium of suitable gearing or belts arranged in any practical manner.

For dressing the side surfaces of the blocks of ice as they are moved along the tramway I prefer to use the two circular saws, N N, shown in Fig. 4; but in place of these saws the knives O O shown in Fig. 5 may be used. The knives O O are made fast to the side pieces, $a\ a$, of the tramway A, so that the edges of the blocks of ice will pass between them, so that any side projections on the blocks which would interfere with the close packing of the ice will be removed by the knives. The saws N are secured upon a single shaft, N', journaled in bearings fitted in the side pieces, $a\ a$, and may receive motion by a suitable belt coming from the main drive-shaft G or from a separate motive power. The saws may be adjusted along the shaft N' by loosening set screws $e$ to suit blocks of different widths.

By constructing the tramway with the trimming saws and devices as described the cutting and storing of ice can take place as soon as the ice is of sufficient thickness, no matter what the surface condition of the ice may be, as all snow, honey-combed ice, and slush or imperfectly-frozen ice will be removed from the blocks by the saw F. Furthermore, the use of the saw F renders the packer entirely independent of the weather, so that he can cut and pack whenever the ice is of proper thickness—a poor surface, snow, sleet, rain, high or low temperature can in no wise affect the regular sawing and storing of the ice—and in some seasons the use of the saw F may save the entire crop of ice, as in bad weather and bad surface conditions ice cannot now be practically and profitably harvested; and the use of the saws improves the "pack," as the blocks are made uniform and can be packed close together, and only the clear solid ice is saved, on which the temperature and elements have a minimum effect, and much more good ice may be packed in the same ice-house than under the old method without the saws. Besides, by the removal of the worthless ice before packing, much labor is saved in handling and the ice, when removed from the ice-house for consumption, is in much better condition and more salable than when packed by the old method.

Having thus fully described my invention, I claim as new and desire to secure by Letters Patent—

1. The combination, with an endless moving ice-elevating chain and a supporting-tramway therefor, of a saw arranged and operated above the endless chain for trimming the surfaces of the blocks of ice, substantially as and for the purposes described.

2. The combination, with an endless ice-elevating chain and a supporting-tramway therefor, of vertical trimming devices arranged at the sides of the tramway for trimming the side edges of the blocks of ice, substantially as described.

3. The combination, with an endless traveling ice-elevating chain and a supporting-tramway therefor, of a saw arranged above the tramway and vertical trimming devices arranged at the sides of the tramway, substantially as and for the purposes set forth.

4. The ice-elevating tramway A, constructed to form the horizontal portion A', and the endless traveling chain, in combination with the saw F, arranged and operated above the said horizontal portion, substantially as and for the purposes described.

5. The combination, with an ice-elevating tramway, an endless traveling chain placed thereon, and a saw arranged and operated above and parallel with the tramway, of a scraper, M, for removing the trash from the blocks of ice, substantially as described.

6. The combination, with an ice-elevating tramway and an endless chain moving therein, of a concaved circular saw arranged and operated above and parallel with the tramway, substantially as and for the purposes described.

GEORGE T. McCORMICK.

Witnesses:
H. D. WEST,
EDGAR TATE.